(12) United States Patent
Rodriguez et al.

(10) Patent No.: US 11,763,363 B2
(45) Date of Patent: Sep. 19, 2023

(54) METHOD, SYSTEM, AND MEDIUM FOR MANAGING SUSPENDED CUSTOMER TRANSACTIONS IN A RETAIL ENVIRONMENT

(71) Applicant: Toshiba Global Commerce Solutions Holdings Corporation, Tokyo (JP)

(72) Inventors: Adrian Rodriguez, Durham, NC (US); Jonathan Waite, Cary, NC (US)

(73) Assignee: TOSHIBA GLOBAL COMMERCE SOLUTIONS HOLDINGS CORPORATION, Tokyo (JP)

( * ) Notice: Subject to any disclaimer, the term of this patent is extended or adjusted under 35 U.S.C. 154(b) by 739 days.

(21) Appl. No.: 16/801,347

(22) Filed: Feb. 26, 2020

(65) Prior Publication Data
US 2021/0264487 A1 Aug. 26, 2021

(51) Int. Cl.
*G06Q 20/20* (2012.01)
*G06Q 20/40* (2012.01)
(Continued)

(52) U.S. Cl.
CPC ....... *G06Q 30/0609* (2013.01); *G06Q 20/206* (2013.01); *G06Q 20/4014* (2013.01);
(Continued)

(58) Field of Classification Search
CPC ............. G06Q 20/206; G06Q 20/4014; G06Q 30/0609; G06V 20/52; G06V 30/18143;
(Continued)

(56) References Cited

U.S. PATENT DOCUMENTS

| 7,448,544 B1 | 11/2008 | Louie et al. |
| 8,099,368 B2 | 1/2012 | Coulter et al. |

(Continued)

FOREIGN PATENT DOCUMENTS

CA   3023925 A1 *   5/2019   ........... G06Q 20/223

OTHER PUBLICATIONS

P. M. Corcoran, "Biometrics and Consumer Electronics: A Brave New World or the Road to Dystopia? [Soapbox]," in IEEE Consumer Electronics Magazine, vol. 2, No. 2, pp. 22-33, Apr. 2013, doi: 10.1109/MCE.2013.2239152. (Year: 2013).*
(Continued)

*Primary Examiner* — Matthew E Zimmerman
*Assistant Examiner* — Latasha D Ramphal
(74) *Attorney, Agent, or Firm* — COATS & BENNETT, PLLC

(57) ABSTRACT

A network node associated with a retail store receives digital images from customers who have initiated a customer transaction at a first location. The digital images are unique and are associated with the transaction. The transaction is then temporarily suspended. To resume the transaction, the customer provides information describing features of the previously provided digital image. The network node uses this information to locate the corresponding digital image, and thus, the corresponding suspended transaction, and to authenticate the customer to resume the transaction. Provided the customer is authenticated, the node resumes the suspended transaction.

18 Claims, 7 Drawing Sheets

(51) Int. Cl.
*G06Q 30/0601* (2023.01)
*G06V 20/30* (2022.01)
*G06V 40/10* (2022.01)
*G06V 40/70* (2022.01)
*G06V 30/18* (2022.01)
*G06V 30/19* (2022.01)
*G06V 10/44* (2022.01)
*G06V 20/52* (2022.01)
*G06V 30/10* (2022.01)

(52) U.S. Cl.
CPC .............. *G06V 10/44* (2022.01); *G06V 20/30* (2022.01); *G06V 20/52* (2022.01); *G06V 30/18143* (2022.01); *G06V 30/19013* (2022.01); *G06V 40/10* (2022.01); *G06V 40/70* (2022.01); *G06V 30/10* (2022.01)

(58) Field of Classification Search
CPC ........ G06V 40/10; G06V 10/44; G06V 20/30; G06V 30/19013; G06V 40/70; G06V 30/10
See application file for complete search history.

(56) References Cited

U.S. PATENT DOCUMENTS

| | | | |
|---|---|---|---|
| 8,720,771 | B2 | 5/2014 | MacKinnon |
| 8,818,873 | B1 | 8/2014 | Kim et al. |
| 8,856,033 | B2 | 10/2014 | Hicks et al. |
| 9,619,976 | B2 | 4/2017 | Sambe |
| 9,721,282 | B2 | 8/2017 | Hitchcock et al. |
| 9,846,877 | B2 | 12/2017 | Khan |
| 10,089,606 | B2 | 10/2018 | Ihm et al. |
| 10,121,133 | B2 | 11/2018 | Nelms et al. |
| 10,140,602 | B2 | 11/2018 | Kelly et al. |
| 2008/0114678 | A1* | 5/2008 | Bennett ................ G06Q 20/407 705/44 |
| 2014/0244411 | A1* | 8/2014 | Kim ................... G06Q 30/0281 705/16 |
| 2015/0095169 | A1 | 4/2015 | Lewis |

OTHER PUBLICATIONS

Mi9 Retail, "Mi9 Retail Suite", Jan. 1, 2016, pp. 1-32, retrieved on Jan. 7, 2019, retrieved from internet: https://mi9retail.com/wp-content/uploads/2016/01/Mi9-Retail_Suite_Brochure_2016.pdf.

* cited by examiner

PROCESSING CIRCUITRY
32

COMMUNICATIONS INTERFACE UNIT/MODULE
120

IMAGE PROCESSING UNIT/MODULE
122

IMAGE UNIQUENESS DETERMINATION UNIT/MODULE
124

FEATURE EXTRACTION UNIT/MODULE
126

IMAGE ASSOCIATION UNIT/MODULE
128

CUSTOMER AUTHENTICATION UNIT/MODULE
130

CUSTOMER TRANSACTION MANAGEMENT UNIT/MODULE
132

FIG. 5

METHOD, SYSTEM, AND MEDIUM FOR MANAGING SUSPENDED CUSTOMER TRANSACTIONS IN A RETAIL ENVIRONMENT

TECHNICAL FIELD

The present disclosure relates generally to processing customer transactions in a retail environment, and more particularly to systems for resuming customer transactions that have been temporarily suspended.

BACKGROUND

"Line busting" is a process of shortening or eliminating checkout lines at a retail establishment. In particular, line busting techniques remove customers from a main checkout line and direct them to a different area for checkout and payment. For example, a customer could be directed by a sales associate to another pay counter, a different pay station, a kiosk, or some other area of the store to pay for an item.

Many retail businesses use line busting techniques fairly regularly; however, most businesses use this technique only during their busiest times or when lines at the checkout counter are extremely long. Such long lines can, for example, deter customers from making or completing a purchase. Thus, in general, line busting helps to reduce or eliminate long checkout lines, thereby helping to enhance the overall customer experience.

Line busting techniques are not only helpful in a "real-time" retail scenario. Rather, line busting techniques can be utilized when splitting a customer transaction into two or more related interactions separated in time. Such situations can occur, for example, when a customer initiates a transaction to purchase an item at a first location, but then completes the transaction at a later time and/or at a different place. Between the time the transaction is initiated and completed, the transaction is temporarily suspended.

For example, a customer may order an item on-line while at home, at work, or scan the item at a Point Of Sale (POS) terminal or kiosk while in the retail store. Conventional systems then assign an order number to the order so that when the customer arrives at a payment/pick-up location in the store to retrieve the item, he/she simply provides the system-generated order number to a store associate. The sales associate then matches the system generated order number to the order numbers in a database and retrieves the item for the customer. Line busting in these cases still helps to reduce or eliminate long lines at the store because the customer initiates the transaction at one location, and completes the transaction at another different location.

BRIEF DESCRIPTION OF THE DRAWINGS

FIG. 5 is a schematic block diagram of a computer program product that configures a computer to resume temporarily suspended customer transactions according to one embodiment of the present disclosure.

DETAILED DESCRIPTION

Embodiments of the present facilitate the management and resumption of a customer transaction that has been temporarily suspended due to the use of a "line busting" technique by the retail store. More particularly, the present embodiments enhance line busting techniques by linking a currently suspended customer transaction to the customer who initiated the transaction using an image provided by the customer. The image is analyzed to ensure uniqueness relative to other suspended customer transactions, and subsequently processed and utilized to authenticate the customer as being authorized to resume and complete the transaction.

Such linking is beneficial because it allows the customer to control the particular aspects that link him/her to the suspended transaction rather than allowing a computer system to automatically generate a long and complicated identifier that the customer will likely not know or remember. Additionally, because the customer controls what particular image is used for authentication, the subsequent authentication process for resuming the transaction is easier and faster for the customer. Specifically, because the customer provided the image when initiating the transaction, he/she knows what is in the image. Therefore, the customer need not reproduce the exact same image for authentication when resuming the suspended transaction. Rather, the customer only needs to describe some of the features of the image. Provided that the image features described by the customer match the features of the initially provided image to within a specified threshold (e.g., 98%), the customer is authenticated to resume and complete the customer transaction. Thus, not only do the embodiments of the present disclosure help to reduce or eliminate long checkout lines, but they also ease the authentication burden on the customer thereby helping to enhance the overall customer experience.

Figure 1:
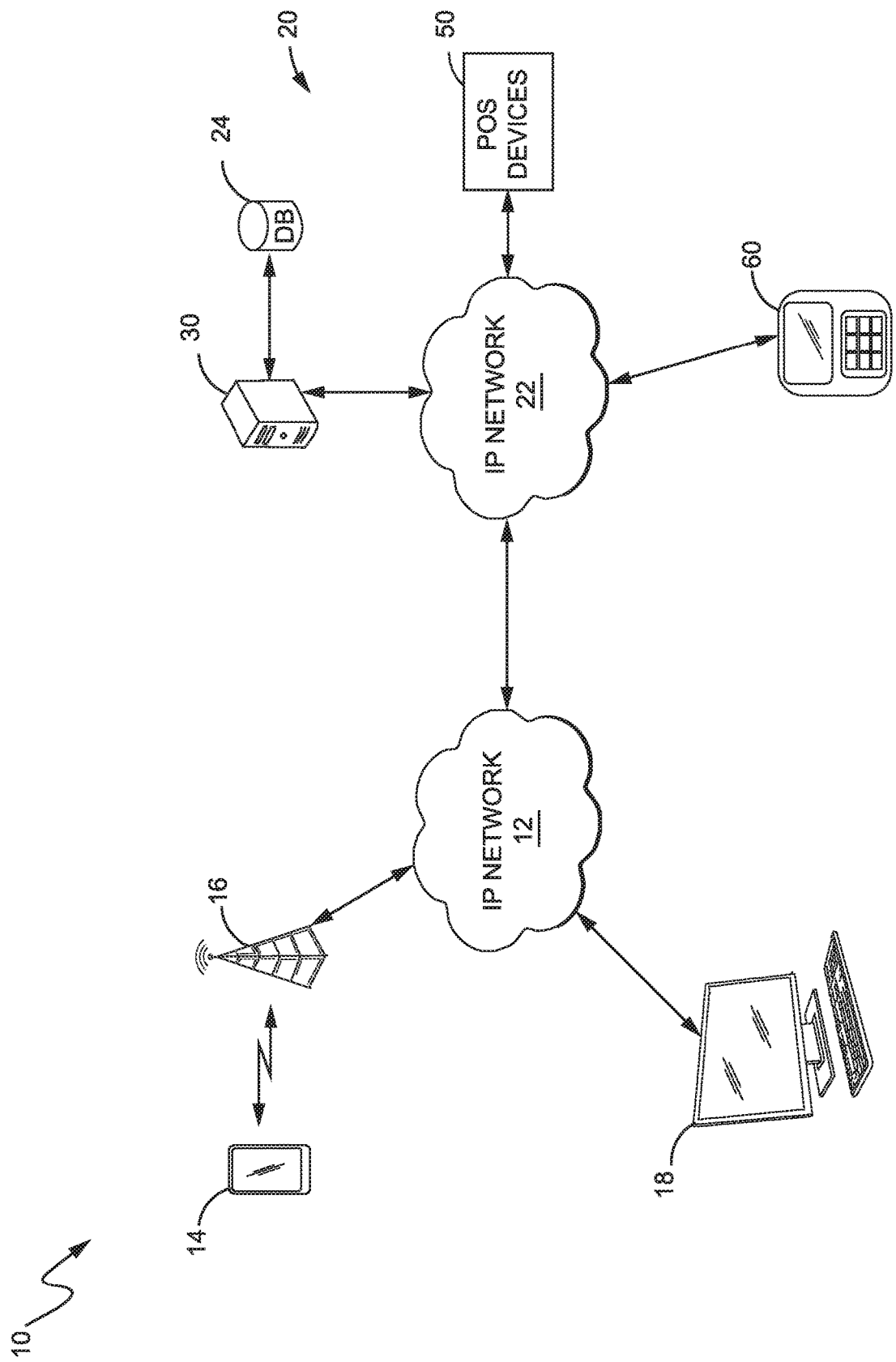
FIG. 1 is block diagram illustrating a communications system configured according to one embodiment of the present disclosure.

Turning now to the drawings, FIG. 1 illustrates some of the components of a communications system 10 configured to perform these functions according to one embodiment of the present disclosure. Those of ordinary skill in the art will readily appreciate that the components seen in system 10 are merely illustrative, and that other components may be present in communications system 10 that are not explicitly illustrated here.

As seen in FIG. 1, communications system 10 comprises an IP network 12 (e.g., the Internet) communicatively connected to a mobile device 14 (e.g., a customer's smartphone or tablet) via a wireless communications system 16, and a computing device 18 (e.g., the customer's home or work based desktop or laptop computer). Communications system 10 also comprises a retail communications network 20 associated with a retail store. As seen in this embodiment, network 20 comprises a private IP network 22 that communicatively connects to IP network 12, as well as a network node 30 connected to a database (DB) 24, one or more POS devices 50 (e.g., POS terminals, kiosks, cameras and/or sensors associated with a frictionless shopping system, and the like), and one or more mobile terminals 60 carried by store employees. In some embodiments, the mobile terminals 60 carried by the store employees are configured to function as POS devices such that the store employee can initiate a transaction on behalf of a customer, and also resume a suspended customer transaction for the customer pending authentication of the customer.

In operation, a customer initiates a customer transaction at a first location to purchase an item from a retail store. The first location may be, for example, the customer's home or workplace, or a public place such as a park or restaurant. In these cases, the customer may order the item from the retail store's website, for example, using his/her mobile device 14 or computer 18. In some embodiments, the first location is at the retail store. In these situations, the customer may scan the item at a POS device 50 (e.g., a POS terminal or a kiosk), or a sales associate may scan the item for the customer using mobile terminal 60.

Regardless of where the transaction is initiated, the transaction gets temporarily suspended and linked to the customer. As stated previously, conventional systems automatically generate an identifier to identify the transaction for the customer. However, these identifiers are long and difficult for the customer to remember. Therefore, according to the present embodiments, the customer controls the linking process as well as the subsequent authentication process. Specifically, the customer uploads a digital image that network node 30 associates with the customer transaction. Upon receipt, node 30 analyzes the digital image to ensure that the image is unique from the other images associated with other suspended customer transactions, and if so, extracts feature information from the image for use in later authenticating the customer to resume the transaction. Node 30 then stores the image and the extracted feature information in database 24.

Later, when the customer arrives at a second location (e.g., the retail store) to complete transaction, the customer provides information to node 30 about the image he/she uploaded when initiating the transaction at the first location. For example, the customer may describe detailed aspects or features of the digital image (e.g., verbally or using a keypad, for example), or the customer may provide another digital image that is similar to the one provided when he/she initiated the transaction. In one embodiment, the POS device 50 at which the customer wishes to resume the transaction can capture an image of an object that also appears in the image provided by the customer when he/she initiated the transaction. Regardless, node 30 checks the newly-provided information against the feature information previously extracted from the digital image. If the newly-provided information matches a predetermined amount of the extracted feature information (e.g., a predetermined match threshold of >=99%), node 30 authenticates the customer to complete the transaction. If the newly-provided information does not match the predetermined amount of the extracted feature information (e.g., <99% match), node 30 prompts the customer to provide additional data with which it can use to authenticate the customer. The customer may then provide additional identification information, such as a loyalty ID, to node 30. If node 30 can authenticate the customer using the additionally provided information, node 30 resumes the suspended customer transaction so that the customer can complete the transaction.

The previous discussion describes the present embodiments in the context of a transaction being initiated at a first location (e.g., on-line at home, or at the retail store in a "line busting" scenario), then being temporarily suspended, and then being resumed at a second location (e.g., at a POS device 50 at the retail store). However, those of ordinary skill in the art should appreciate that these examples are merely illustrative, and that the present disclosure is not limited only to such situations.

In at least one embodiment, for example, the retail store is "zoned." Each "zone" is associated with a predefined area of the store (e.g., the produce section, the dairy section, the frozen food section, a candy aisle, the checkout area, etc.), and comprises one or more cameras that can track the customer's movement through the zones. In such situations, the cameras capture an image of the customer and the customer's order whenever he/she selects an item (e.g., produce from a produce zone) and send those images to node 30. Once the customer leaves the zone, node 30 suspends the customer order. Responsive to detecting that the customer has entered the checkout zone, node 30 resumes the customer order. The customer can then pay for the selected items at a POS device 50, for example. In stores that are configured for "frictionless shopping," node 30 detects when the customer leaves the checkout area and charges the customer's account for the selected items.

Figure 2A:
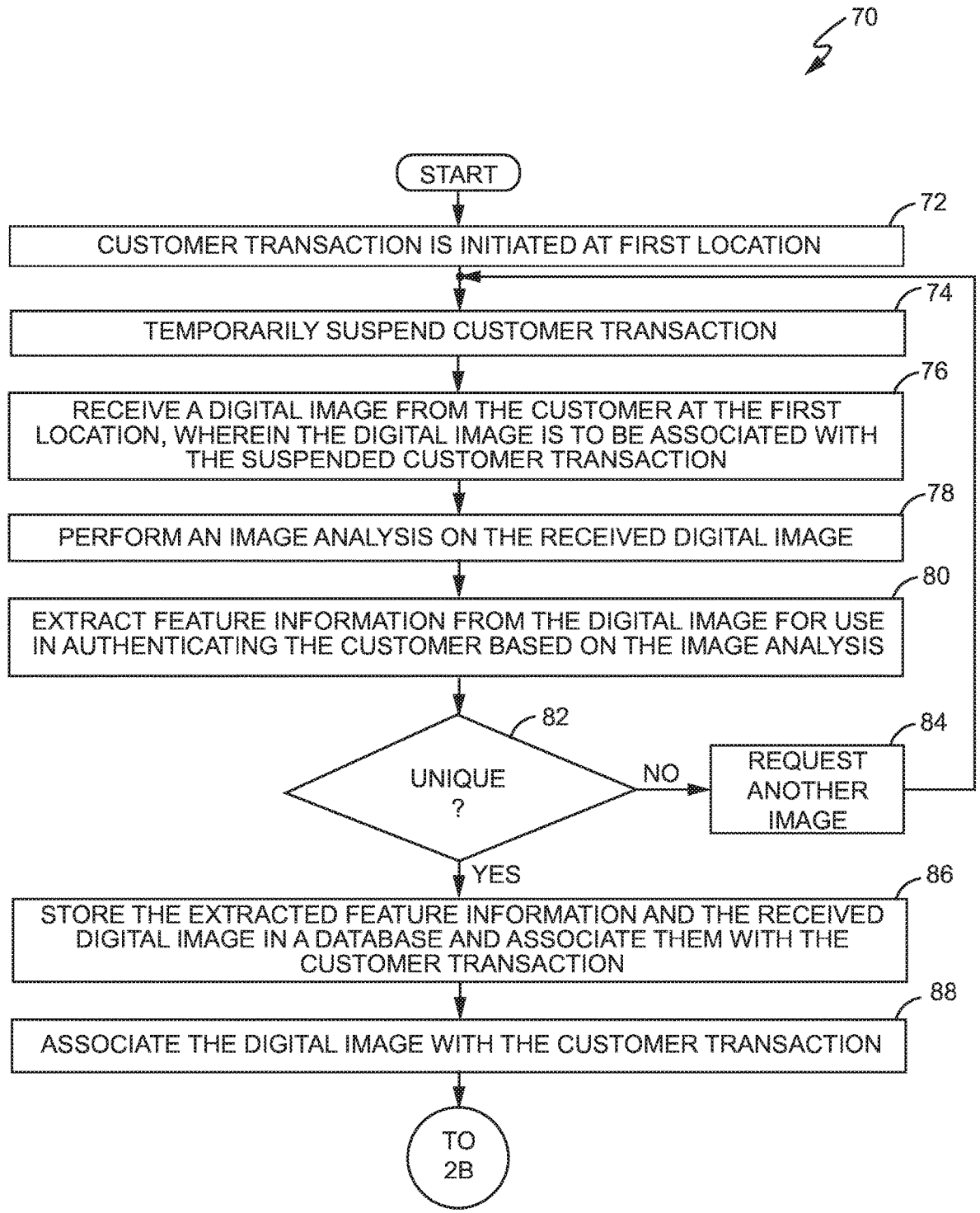
FIGS. 2A-2B are flow diagrams illustrating a method for resuming a customer transaction that has been temporarily suspended according to one embodiment of the present disclosure.
Figure 2B:
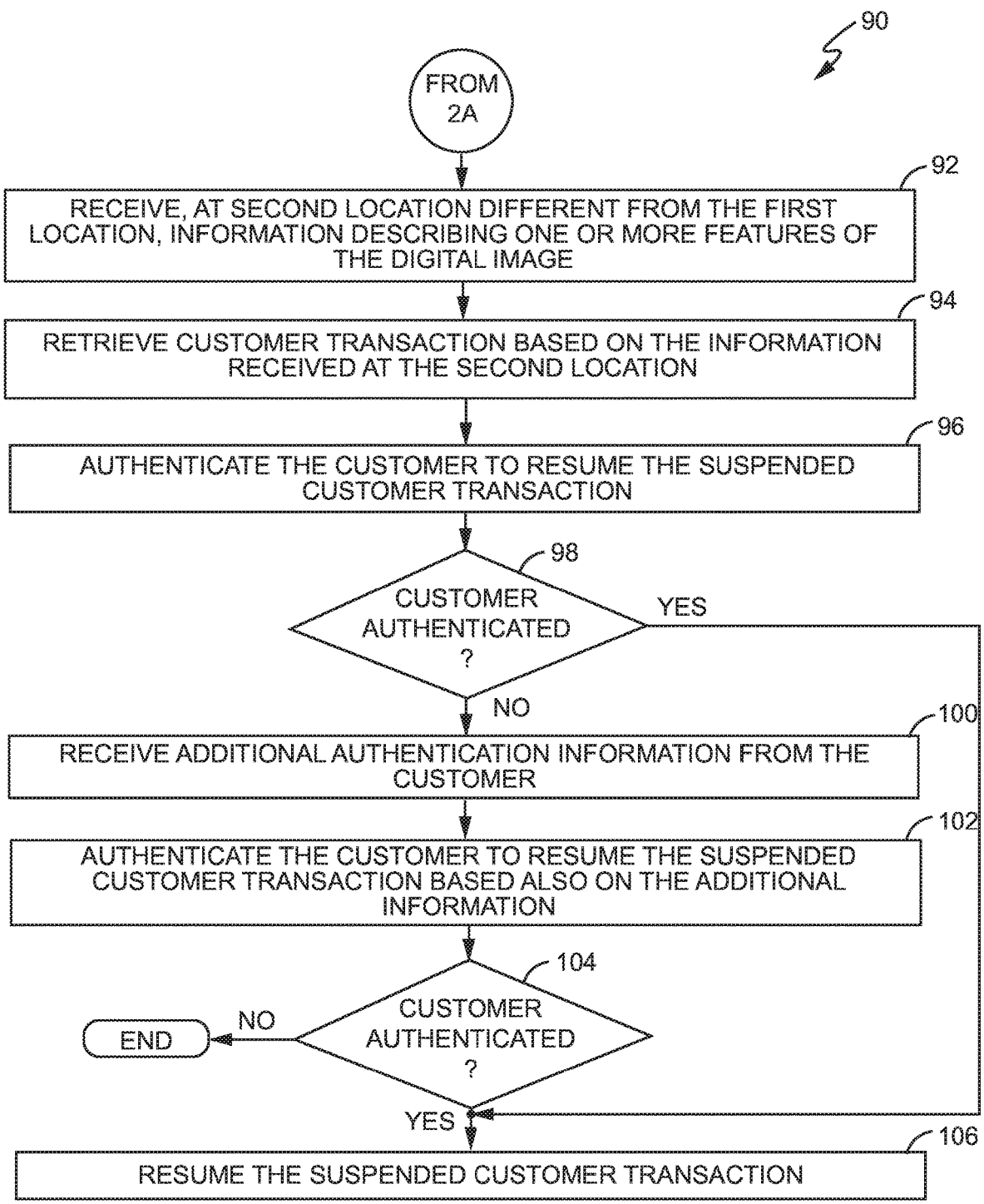
Figure 3:
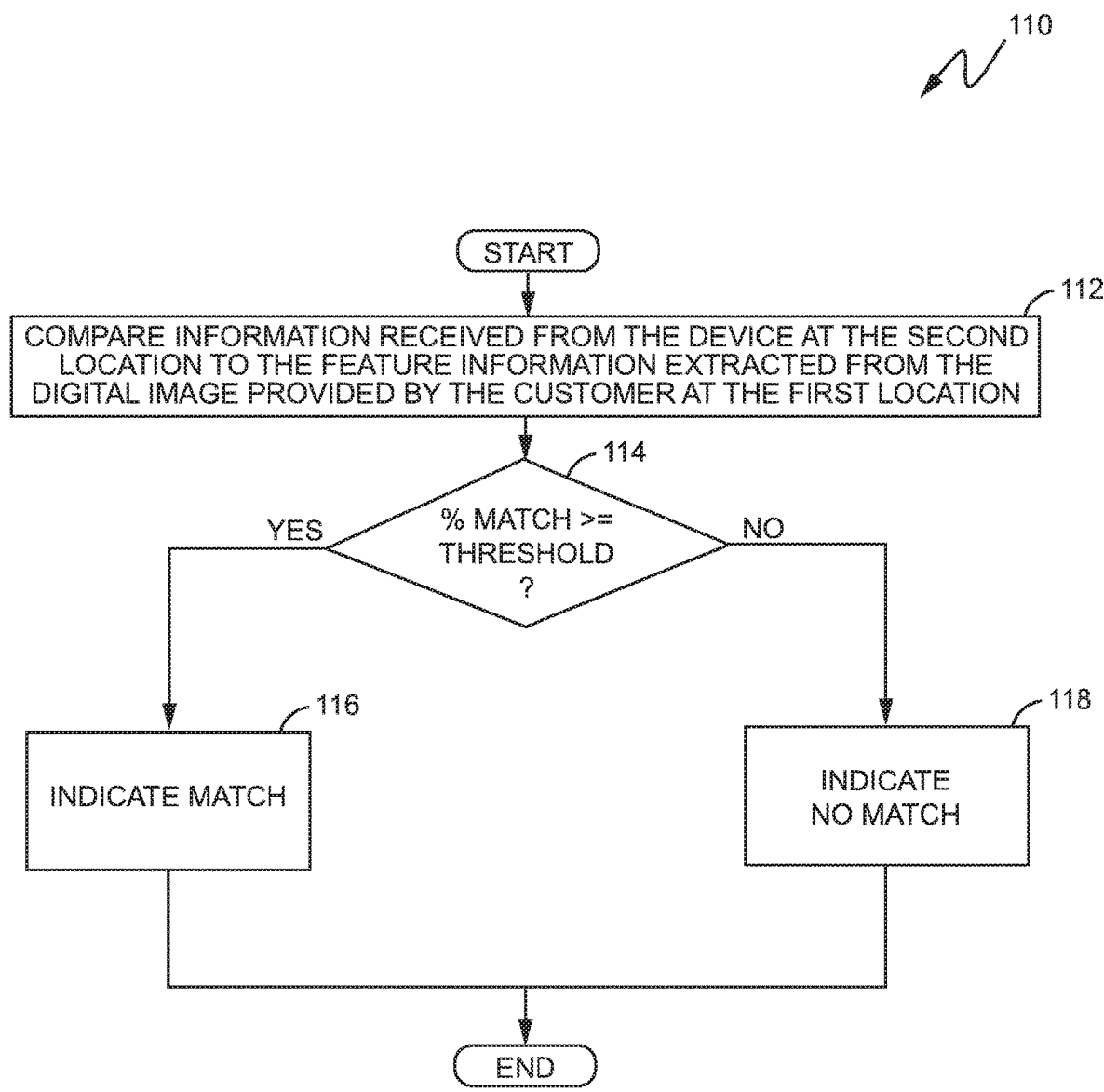
FIG. 3 is a flow diagram illustrating a method for determining whether a given customer is authenticated to resume a temporarily suspended transaction according to one embodiment of the present disclosure.

FIGS. 2A-2B are flow diagrams illustrating a method 70 for resuming a suspended transaction according to embodiments of the present disclosure. As seen in FIG. 3, method 70 begins with the customer initiating a customer transaction at a first location (box 72). At some point, such as when the customer is finished ordering items, the transaction is temporarily suspended (box 74). Node 30, as stated above, then receives a digital image from the customer that is to be associated with the suspended customer transaction (box 76). By way of example only, the customer may upload a digital image of his/her boots having a scuff mark running diagonally across a toe portion of the boot. Upon receipt of the digital image, node 30 performs an image analysis on the digital image (box 78) and extracts feature information for use in authenticating the customer when the customer goes to resume the transaction at another location (box 80).

There are a variety of known methods and techniques with which the present embodiments can process the digital image to extract a set of features. Regardless of the particular algorithms, however, node 30 processes and analyzes the digital images it receives from customers to detect and isolate different portions or shapes of the objects (i.e., the features of the objects) in the digital image. Some types of algorithms that node 30 may be configured to use to implement such feature extraction include, but are not limited to, edge detection algorithms, corner detection algorithms, blob detection algorithms, ridge detection algorithms, and scale-invariant feature transform (SHIFT) algorithms. To detect shapes, node 30 can also be configured to implement well-known techniques such as thresholding, blob extraction, template matching, and Hough transforms. In some embodiments, the image provided by the customer is a video clip. Therefore, in some embodiments, node 30 is also configured to detect motion using one or more known motion detection and/or optical flow techniques. In other embodiments, node 30 is configured to detect and extract text features from the digital image.

In one embodiment, node 30 is configured to detect and extract features from the digital image using a combination of feature extraction techniques. By way of example only, consider a situation where a customer provides a digital image of a magazine cover to node 30 to use for subsequent authentication. Upon receipt, node 30 could be configured to detect and extract various text features of the digital image, such as the title of the magazine cover, the date the magazine was published, one or more of the article titles that appear in the magazine, and the like. Additionally, node 30 could also be configured to detect and extract other non-text objects and/or shapes, such as balls, people, sports equipment, landscapes, and the like, pictured on the magazine's cover using one or more of the previously mentioned known techniques.

Regardless of the technique(s) used by node 30 to analyze and extract the feature information from the digital image, however, node 30 is configured to compare the digital image, and in some embodiments, the features extracted from that digital image, to all other digital images and extracted feature information associated with other currently suspended customer transactions. The comparison is to ensure that the digital image provided by the customer is sufficiently unique from all other digital images associated with all the other currently suspended customer transactions (box 82). If the digital image provided by the customer is not unique, node 30 generates a prompt to send to the user requesting that the user submit another, different digital image (box 84). If the digital image provided by the customer is unique, however, node 30 stores the digital image and the extracted in a memory (e.g., DB 24) (box 86) and associates the digital image with the customer transaction (box 88).

Subsequently, the customer will want to resume his/her currently suspended customer transaction, as seen in method 90 of FIG. 2B. For example, the customer will go to a second location (e.g., the retail store) to complete the transaction. In such cases, node 30 will receive information describing one or more features of the digital image originally provided by the customer (box 92). The information is provided by a device at the second location, such as the customer's mobile device 14 or a POS device 50 equipped with one or more cameras, microphones, keypads, or other sensors and user input devices. In some embodiments, for example, the customer may provide node 30 (via a POS device 50 or his/her mobile device 14) with a second image that is similar to, or the same as, the previously provided digital image. In other embodiments, the customer may utilize a keypad at a pay kiosk, mobile terminal 60, or other POS device 50 to enter a text description of one or more of the features of the digital image he/she previously provided. In cases where the POS device 50 is equipped with a microphone, the customer can simply speak the descriptive information into the microphone. Voice-to-text software at the POS device 50, mobile terminal 60, or node 30 could then convert the customer's speech to text, as is known in the art. Regardless of how node 30 receives the descriptive information from the device at the second location, however, node 30 analyzes the information, compares the information to the information of digital images associated with other suspended customer transactions, locates the digital image, and retrieves the customer transaction that is associated with the digital image (box 94).

For example, consider the situation where the customer, when initiating the transaction, provided a digital image of a pair of boots with a scuff mark extending diagonally across a toe portion of one of the boots. When the user arrives at the second location, he/she need not provide node 30 with the same digital image provided by the customer at the first location (although in one embodiment, this is possible). Rather, the customer merely needs to describe the digital image as including "a pair of boots with a scuff mark extending diagonally across a toe portion of one of the boots." Node 30 is configured to parse the description and compare those parsed portions to the information extracted from the digital images to find a match. If a match is found, node 30 will have located the correct customer transaction, as well as the information that can be used to authenticate the customer to resume the transaction.

It should be noted that the present disclosure does not require the customer to provide the information at the second location in all embodiments. In some embodiments, for example, a sensor (e.g., a camera) at the POS device 50 will capture an image of the user and/or an object that is in the digital image originally provided by the customer (e.g., the customer's boots). In these latter cases, the customer might have some input or control over where to focus or point the camera so that the resultant image includes an object (or similar object) contained in the originally-provided digital image. The image would then be sent to node 30 for analysis and feature extraction, as previously described. The resultant information would be compared to the feature information extracted from the originally provided digital image, and based on those results, node 30 would locate the appropriate customer transaction, as well as the information that can be used to authenticate the customer to resume the transaction.

Once the appropriate suspended customer transaction has been retrieved, node 30 will authenticate the customer to resume the suspended customer transaction (box 96). For example, in one embodiment, node 30 will compare the information it received from the device at the second location to the feature information extracted from the digital image provided by the customer at the first location (box 98). If the comparison reveals that amount of information provided by the device at the second location matches a predetermined amount (e.g., >=99%) of the feature information extracted from the digital image originally provided by the customer at the first location, node 30 will authenticate the customer and resume the suspended customer transaction (box 106). However, if the comparison reveals that amount of information provided by the device at the second location does not match the predetermined amount of feature information extracted from the digital image originally provided by the customer at the first location, node 30 will not authenticate the customer. Instead, node 30 will prompt the customer to provide additional authentication information (e.g., a loyalty ID number, Driver License number, order number, additional image, etc.) (box 100).

Node 30 then authenticates the customer based on the additional authentication provided by the customer. For example, node 30 may compare the additional information to known information in a profile associated with the customer stored in DB 24 (box 102). If the comparison reveals that the additional information provided by the customer matches the known additional information (box 104), node 30 authenticates the customer and resumes the suspended customer transaction (box 106). Otherwise, node 30 denies the request to resume the suspended customer transaction and the method ends.

Thus, according to one embodiment of the present disclosure, the customer need not provide the exact same image or authentication information at both the first and the second locations. Instead, the customer needs only to provide enough authentication information to allow node 30 to locate the correct suspended customer transaction and corresponding digital image. The additional authentication information is required only when node 30 is not able to sufficiently authenticate the customer based on the feature information extracted from the digital image provided at the first location by the customer.

FIG. 3 is a flowchart illustrating a method 110 by which node 30 can determine whether the amount of information provided at the second location is enough to authenticate the customer. As seen in method 110, node 30 compares the information received at the second location to the feature information extracted from the digital image provided at the first location by the customer. As long as the amount of additional information meets or exceeds some predetermined amount of the extracted feature information (e.g., >=99%), node 30 returns a signal or message indicating a "MATCH" (box 116). If not, node 30 returns a signal or message indicating a "NO MATCH" condition. Based on these return values, node 30 will authenticate, or not authenticate, the customer.

Figure 4:
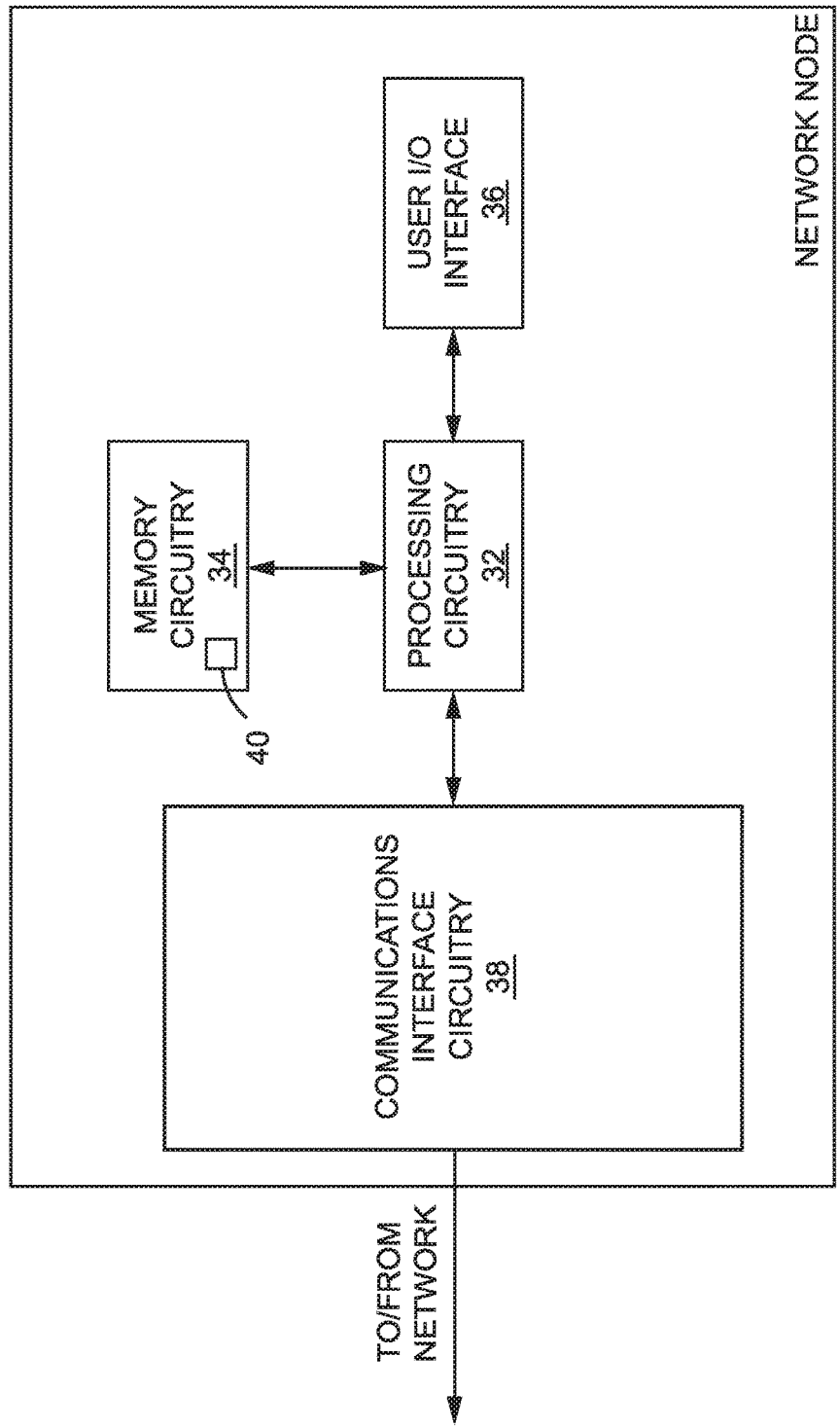
FIG. 4 is schematic block diagram illustrating some of the component parts of a network node configured to resume temporarily suspended customer transactions according to one embodiment of the present disclosure.

FIG. 4 is schematic block diagram illustrating some of the main functional components of a network node 30 configured to resume temporarily suspended customer transactions according to the present disclosure. As seen in FIG. 4, node 30 is a computer device and comprises processing circuitry 32, memory 34 storing a control program 40, a user input/output (I/O) interface 36, and a communications interface circuit 38.

Processing circuitry 32 comprises one or more microprocessors, hardware circuits, firmware or a combination thereof. In the exemplary embodiments described herein, processing circuitry 32, as previously described, is configured to authenticate a customer to resume a temporarily suspended customer transaction, and to resume the transaction upon authenticating the customer. Additionally, as previously described, processing circuitry 32 is configured to communicate information to one or more POS devices 50 via IP networks 12 and/or 14 indicating whether the customer is/is not authenticated. In particular, processing circuitry 112 is configured according to the present embodiments to compare information previously provided by the client and received at node 30, and to authenticate the customer and identify the appropriate suspended customer transaction based on the results of the comparison, as previously described. So long as the customer is authenticated, processing circuitry is further configured to resume the suspended transaction, as previously described.

Memory 34 comprises a non-transitory computer readable medium that stores executable program code and data used by the processing circuitry 32 for operation. In this embodiment, the program code and data comprises a control program 40 that, when executed by processing circuitry 32, configures node 30 to perform the functions previously described. In some embodiments, control program 40 has access to customer preference information that, as previously described, can be utilized to authenticate the customer in some cases. Memory 34 may include both volatile and non-volatile memory, and may comprise random access memory (RAM), read-only memory (ROM), and electrically erasable programmable ROM (EEPROM) and/or flash memory. Additionally or alternatively, memory 34 may comprise discrete memory devices, or be integrated with one or more microprocessors in the processing circuitry 32.

The user I/O interface 36 comprises one or more input devices and display devices to enable a user to interact with and node 30. Such devices may comprise any type of device for inputting data into a computing device including, but not limited to, keyboards, number pads, push buttons, touchpads, touchscreens, or voice activated inputs. The display devices that comprise user I/O interface 36 may comprise, for example, a liquid crystal display (LCD) or light emitting diode (LED) display, or a touchscreen display that also functions as a user input device.

The communications interface circuit 38 comprises, in one embodiment, a transceiver circuit and/or interface circuit for communicating with remote devices, such as terminal 60, POS devices 50, database 24, and customer devices 14, 18, over IP networks 12, 22, as previously described. For example, using communications interface circuit 38, node 30 receives digital images provided by the customer using device(s) 14, 18, 60, as previously described, and prompts the customer for additional authentication information, as previously described. Additionally, node 30 will indicate to another node (e.g., a POS device 50 or terminal 60) whether a given customer is or is not authenticated to resume a suspended customer transaction. In this regard, the communications interface circuit 38 according to embodiments of the present disclosure may comprise a WiFi interface, a cellular radio interface, a BLUETOOTH interface, an Ethernet interface, or other similar interface for communicating over a communication network or a wireless communication link.

FIG. 5 is a schematic block diagram of a computer program product such as control program 40 that configures node 30 to authenticate a customer and to resume a temporarily suspended customer transaction based on the authentication according to one embodiment of the present disclosure. As seen in FIG. 5, the control program 40 comprises a plurality of units/modules including a communications interface unit/module 120, an image processing unit/module 122, an image uniqueness determination unit/module 124, a feature extraction unit/module 126, an image association unit/module 128, a customer authentication unit/module 130, and a customer transaction management unit/module 132.

The communications interface unit/module 120 comprises program code that is executed by processing circuitry 32 to facilitate communicating data and information with one or more remote devices (e.g., mobile device 14, computer 18, POS devices 50, and terminal 60) via IP network 12 and/or 22. As described above, such data and information includes, but is not limited to, digital images provided by a customer at a first location, and data and information provided by other devices at a second, different location.

The image processing unit/module 122 comprises program code that is executed by processing circuitry 32 to perform the image analyses on the digital images received by the communications interface unit/module 120. The algorithms and techniques used to analyze the digital images are well-known, and thus, not described in detail here. The image uniqueness determination unit/module 124 comprises program code that is executed by processing circuitry 32 to determine whether the digital image provided by the customer at the first location is sufficiently unique from other digital images associated with other currently suspended customer transactions.

The feature extraction unit/module 126 comprises program code that is executed by processing circuitry 32 to detect and extract the various features of a digital image, as previously described. The image association unit/module 128 comprises program code that is executed by processing circuitry 32 to associate the digital image with a suspended customer transaction provided the image uniqueness determination unit/module 124 determines the digital image to be sufficiently unique.

The customer authentication unit/module 130 comprises program code that is executed by processing circuitry 32 to authenticate the customer, as previously described. The customer transaction management unit/module 132 comprises program code that is executed by processing circuitry 32 to resume a customer transaction based on whether the customer is authenticated to resume the transaction, as previously described.

The present embodiments may, of course, be carried out in other ways than those specifically set forth herein without departing from essential characteristics of the invention. For example, in addition to the previous embodiments, the disclosure may be configured for use in "frictionless" shopping environments. As is known in the art, "frictionless" shopping systems allow customers to purchase items from a store while eliminating or greatly reducing the amount of contact required between the customer and the store employees. Such systems also seamlessly integrate known customer data into their purchases in an effort to enhance the customer experience. As an example, a store configured for such frictionless shopping may identify a customer and track that customer as he/she travels through the store selecting items to purchase. Rather, than have the customer physically perform a checkout process, however, the frictionless system allows the customer to leave the store without expressly scanning the items or interacting with a POS device 50. Particularly, because the frictionless system has identified and tracked the customer through the store, as well as the identified the items he/she selected, such systems can automatically deduct the owed amount from the customer's account responsive to detecting when he/she enters a checkout area of the store or leaves the store.

Figure 6:
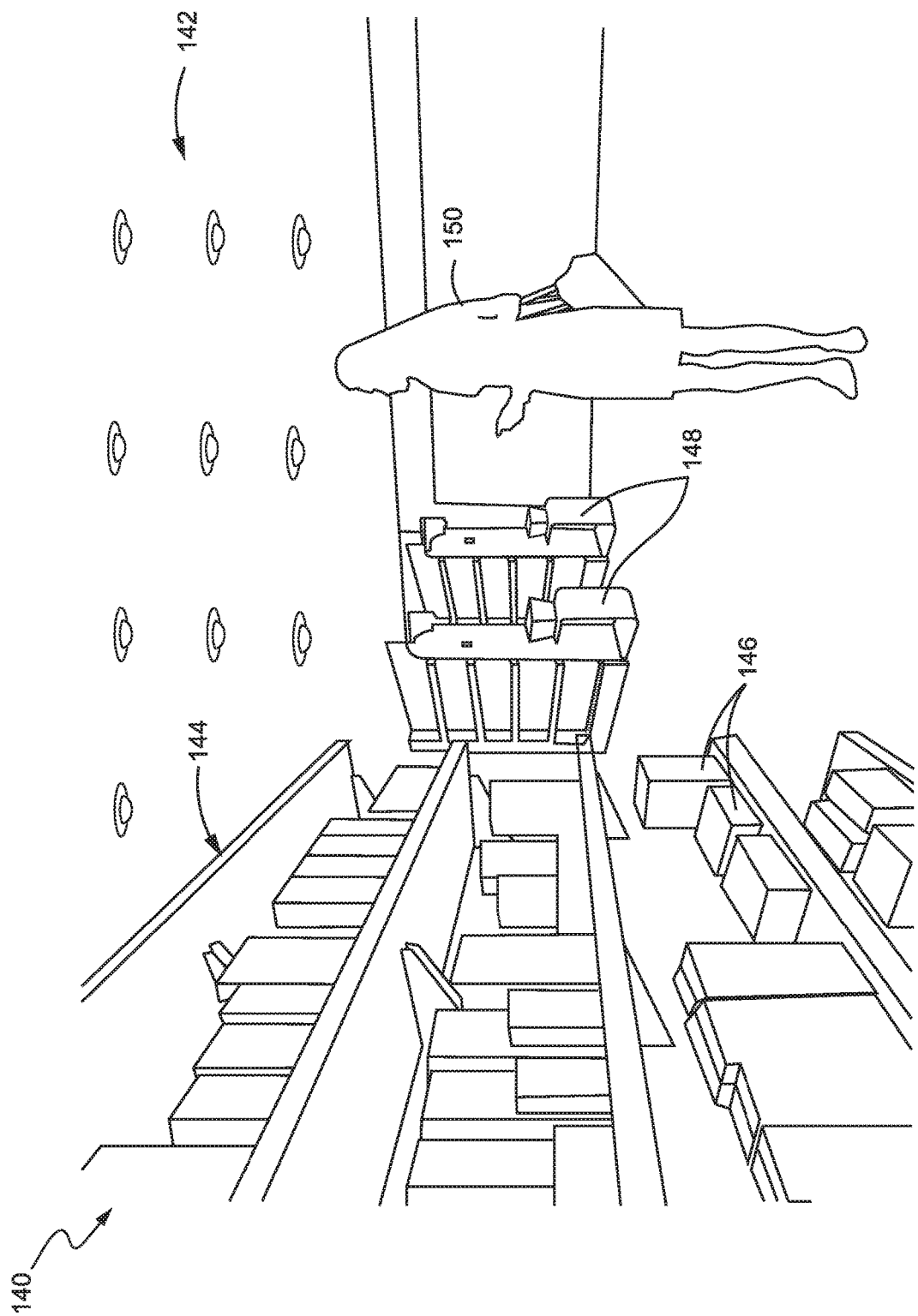
FIG. 6 illustrates a retail store including a frictionless shopping system configured according to one embodiment.

For example, FIG. 6 illustrates such a frictionless system 140 configured according to one embodiment. As seen in FIG. 6, the frictionless system 140 covers the floor of a retail store having a plurality of sensors 142 (e.g., cameras) distributed throughout the store, a plurality of shelves 144 for displaying items 146 for purchase by a customer 150, and one or more kiosks 148 that function as POS devices 50.

According to this embodiment, the sensors 142 capture images of the customer 150 and the items 146 he/she selects for purchase, and sends those images to node 30. The sensors 142 also provide an image that node 30 will subsequently use to authenticate the customer 150 when resuming the transaction, as previously described. Upon receipt, node 30 digitally analyzes the images and, based on that analysis, identifies the customer 150 as well as the items 146 that the customer selected for purchase. If these are the first items to be connected to the customer 150, node 30 is configured to initiate a customer transaction for the items 146. If a customer transaction has already been initiated, however, node 30 will add items 146 to the customer transaction.

Regardless, node 30 suspends the customer transaction responsive to receiving data from sensors 142 indicating that the customer 150 has left the area or "zone" where items 146 are displayed. Then, responsive to receiving data from sensors 142 indicating that the customer 150 has entered a checkout area (e.g., the area in which kiosks 148 are located), node 30 resumes the transaction. Particularly, the customer 150 may stop at kiosk 148 to verify the items 146 he/she selected to the retail store. Node 30 then receives another image (e.g., an image provided by the customer 150 or captured by a sensor 142), and then authenticates the customer 150 to resume the transaction based on a digital image analysis of the images, as previously described. Once authorized, the customer 150 is permitted to leave the store with the items 146, and node 30 will charge the customer's 150 account for the selected items.

The previous embodiments describe the image provided by the customer at the first location as being a picture of a pair of boots or a magazine cover. However, this is merely for illustrative purposes. The digital image provided by the customer at the first location may also be a picture of the customer, or of the customer's identification card or ID badge, or of a barcode or QR Code (regardless of whether it is or is not associated with the customer), or of the customer's hand, finger, or other appendage, or of a landscape, a house, an image of the customer's cart or shopping basket, retail assets in use during the transaction and the like. The present embodiments do not require the digital image to have encoded content that links to the customer transaction. Rather, the present embodiments allow the customer who provided the digital image to positively identify some or all of the features in the digital image so that node 30 is able to locate the appropriate suspended customer transaction and authenticate the customer to resume that transaction.

Additionally, the previous embodiments describe node 30 as determining whether the digital image provided by the customer is unique. In one embodiment, node 30 performs this function by comparing the digital image provided by the customer against all other digital images associated with all other currently suspended customer transactions in the retail store. Where the retail store comprises a large enterprise, node 30 can be configured to perform this function to ensure uniqueness of the digital image across all of the retail stores in the enterprise, or across some of the retail stores in the enterprise, or across a predetermined region or sub-region (i.e., regionalization) covered by one or more of the retail stores in the enterprise. In some embodiments, the digital image and the associated customer transaction are associated with a timer that begins when the customer initiates the transaction. If the customer fails to successfully resume the transaction before the timer expires, node 30 may delete the customer transaction.

In one embodiment, a given digital image remains "unique" in the retail system for a predetermined period of time after the customer transaction has been completed. This embodiment helps to ensure that customers cannot use the same digital image for multiple transactions within that time period (e.g., 24 hours). To accomplish this, node 30 may associate another timer with the digital image. So long as the time has not expired, that same digital image cannot be provided by the same or another customer when initiating a transaction.

Therefore, the present embodiments are to be considered in all respects as illustrative and not restrictive, and all changes coming within the meaning and equivalency range of the appended claims are intended to be embraced therein.

What is claimed is:

1. A method implemented at a network node of resuming a suspended retail customer transaction, the method comprising:
receiving, at the network node via communications interface circuitry, a digital image from a customer at a first location, wherein the digital image is to be associated with a suspended customer transaction initiated by the customer at the first location;
computationally detecting and extracting feature information from the digital image for use in authenticating the customer based on an image analysis performed on the digital image;
receiving, at the network node via the communications interface circuitry, information describing one or more features of the digital image, wherein the information is received from a device at second location different from the first location;
authenticating the customer to resume the suspended customer transaction at the second location, wherein the authenticating comprises:

comparing the information received from the device at the second location to the feature information extracted from the digital image;

determining, based on the comparing, that an amount of the information received from the device at the second location meets or exceeds a predetermined percentage of the feature information extracted from the digital image; and authenticating the customer to resume the suspended customer transaction at the second location responsive to the determining; and controlling the device at the second location to resume the suspended customer transaction responsive to authenticating the customer, wherein the controlling comprises:

generating a match signal indicating that the amount of the information received from the device at the second location meets or exceeds the predetermined percentage of the feature information extracted from the digital image; and outputting the match signal to the device at the second location indicating that the customer has been authenticated, wherein the match signal is configured to trigger the device at the second location to resume the suspended customer transaction.

2. The method of claim 1, further comprising determining whether the digital image received from the customer at the first location is unique from other digital images provided by other customers.

3. The method of claim 2, wherein the digital image is unique responsive to determining that the digital image has not been associated with any other customer transactions for a predetermined amount of time.

4. The method of claim 2, further comprising:
associating the digital image with the suspended customer transaction responsive to determining that the digital image is unique; and
requesting the customer to provide a different digital image to use for authentication responsive to determining that the digital image is not unique.

5. The method of claim 2, wherein the digital image is unique responsive to determining that the digital image is not associated with any other currently suspended customer transactions.

6. The method of claim 5, wherein the other currently suspended customer transactions comprise customer transactions currently suspended in a predetermined geographical region.

7. The method of claim 5, wherein the other currently suspended customer transactions comprise customer transactions currently suspended across a retail enterprise.

8. The method of claim 1, wherein authenticating the customer to resume the suspended customer transaction further comprises requesting additional authentication information from the customer responsive to determining that the amount of the information received from the device at the second location does not match the predetermined percentage of the feature information extracted from the digital image.

9. The method of claim 8, wherein authenticating the customer to resume the suspended customer transaction further comprises authenticating the customer based on the additional authentication information.

10. The method of claim 1, wherein the information received from the device at the second location is provided by the customer that provided the digital image.

11. A computing device configured to resume suspended retail customer transactions, the computing device comprising:

communications circuitry configured to communicate messages with one or more devices via a communications network; and processing circuitry communicatively connected to the communications circuitry and configured to:

receive, via the communications circuitry, a digital image from a customer at a first location, wherein the digital image is to be associated with a suspended customer transaction initiated by the customer at the first location;

computationally detect and extract feature information from the digital image for use in authenticating the customer based on an image analysis performed on the digital image;

receive, via the communications circuitry, information describing one or more features of the digital image from a device at second location different from the first location;

authenticate the customer to resume the suspended customer transaction at the second location, wherein to authenticate the customer, the processing circuitry is configured to:

determine, based on the comparing, that an amount of the information received from the device at the second location meets or exceeds a predetermined percentage of the feature information extracted from the digital image; and authenticate the customer to resume the suspended customer transaction at the second location responsive to the determining; and control the device at the second location to resume the suspended customer transaction responsive to authenticating the customer, wherein to control the device at the second location, the processing circuitry is further configured to:

generate a match signal indicating that the amount of the information received from the device at the second location meets or exceeds the predetermined percentage of the feature information extracted from the digital image; and output the match signal to the device at the second location indicating that the customer has been authenticated, wherein the match signal triggers the device at the second location to resume the suspended customer transaction.

12. The computing device of claim 11, wherein the processing circuitry is further configured to determine whether the digital image received from the customer at the first location is unique from other digital images provided by other customers.

13. The computing device of claim 12, wherein the processing circuitry is configured to determine that the digital image is unique responsive to determining that the digital image has not been associated with any other customer transactions for a predetermined amount of time.

14. The computing device of claim 12, wherein the processing circuitry is further configured to:
associate the digital image with the suspended customer transaction responsive to determining that the digital image is unique; and
request the customer to provide a different digital image to use for authentication responsive to determining that the digital image is not unique.

15. The computing device of claim 11, wherein the processing circuitry is further configured to request additional authentication information from the customer responsive to determining that the amount of the information received from the device at the second location does not match the predetermined percentage of the feature information extracted from the digital image.

16. The computing device of claim 15, wherein authenticating the customer to resume the suspended customer transaction further comprises authenticating the customer based on the additional authentication information.

17. The computing device of claim 11, wherein the information received from the device at the second location is provided by the customer that provided the digital image.

18. A non-transitory computer readable medium storing program code that, when executed by a processing circuit of a computing device of a retail store, causes the computing device to:
   receive, via communications interface circuitry, a digital image from a customer at a first location, wherein the digital image is to be associated with a suspended customer transaction initiated by the customer at the first location;
   computationally detect and extract feature information from the digital image for use in authenticating the customer based on an image analysis performed on the digital image;
   receive, via the communications interface circuitry, information describing one or more features of the digital image from a device at second location different from the first location;
   authenticate the customer to resume the suspended customer transaction at the second location, wherein to authenticate the customer, the program code, when executed by the processing circuitry, causes the computing device to:
      compare the information received from the device at the second location to the feature information extracted from the digital image;
      determine, based on the comparing, that an amount of the information received from the device at the second location meets or exceeds a predetermined percentage of the feature information extracted from the digital image; and
      authenticate the customer to resume the suspended customer transaction at the second location responsive to the determining; and
   control the device at the second location to resume the suspended customer transaction responsive to authenticating the customer, wherein to control the device at the second location, the program code, when executed by the processing circuit, causes the computing device to:
      generate a match signal indicating that the amount of the information received from the device at the second location meets or exceeds the predetermined percentage of the feature information extracted from the digital image; and
      output the match signal to the device at the second location indicating that the customer has been authenticated, wherein the match signal is configured to trigger the device at the second location to resume the suspended customer transaction.

* * * * *